(12) United States Patent
Tsirkin et al.

(10) Patent No.: US 10,310,887 B2
(45) Date of Patent: Jun. 4, 2019

(54) CPU OVERCOMMIT WITH GUEST IDLE POLLING

(71) Applicant: Red Hat, Inc., Raleigh, NC (US)

(72) Inventors: Michael Tsirkin, Lexington, MA (US); Henri van Riel, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 127 days.

(21) Appl. No.: 15/438,979

(22) Filed: Feb. 22, 2017

(65) Prior Publication Data

US 2018/0239625 A1    Aug. 23, 2018

(51) Int. Cl.
G06F 9/455      (2018.01)
G06F 9/48       (2006.01)

(52) U.S. Cl.
CPC ........ G06F 9/45558 (2013.01); G06F 9/4812 (2013.01); G06F 9/4881 (2013.01); *G06F 9/45533* (2013.01); *G06F 2009/45575* (2013.01)

(58) Field of Classification Search
None
See application file for complete search history.

(56) References Cited

U.S. PATENT DOCUMENTS

| | | |
|---|---|---|
| 8,352,944 B2 | 1/2013 | Weissman et al. |
| 8,875,162 B2 | 10/2014 | Agesen et al. |
| 9,122,765 B1 | 9/2015 | Chen |
| 2010/0218183 A1* | 8/2010 | Wang .................... G06F 1/3228 718/1 |
| 2012/0036292 A1* | 2/2012 | Anand .................... G06F 13/22 710/47 |
| 2014/0082240 A1* | 3/2014 | Coleman ............... G06F 9/4812 710/260 |
| 2015/0058847 A1 | 2/2015 | Zheng et al. |
| 2015/0347169 A1 | 12/2015 | Tsirkin |
| 2016/0124762 A1 | 5/2016 | Tsirkin et al. |

OTHER PUBLICATIONS 33.4. Overcommitting Resources, Copyright 2017 Red Hat, Inc. (2 pages) Link: https://access.redhat.com/documentation/en-US/Red_Hat_Enterprise_Linux/5/html/Virtualization/sect-Virtualization-Tips_and_tricks-Overcommitting_with_KVM.html.
Xi et al., RT-Xen: Towards Real-time Hypervisor Scheduling in Xen, Department of Computer Science and Engineering, Washington University in St. Louis, 2011 Proceedings of the International Conference on Embedded Software, Oct. 9-14, 2011 (10 pages).
Brambley, Rich, VMware ESX Memory Over Commit Technology Explained, Jan. 30, 2009 (4 pages) Link: http://vmetc.com/2009/01/30/vmware-esx-memory-over-commit-technology-explained/.

* cited by examiner

*Primary Examiner* — Wynuel S Aquino
(74) *Attorney, Agent, or Firm* — K&L Gates LLP

(57) ABSTRACT

A system for CPU overcommit with guest idle-polling includes a memory, a plurality of host CPUs in communication with the memory, a virtual machine, and a hypervisor. The plurality of host CPUs include a first host CPU and a second host CPU. The virtual machine includes a virtual central processing unit (VCPU) and a guest. In an example, the VCPU executes on the first host CPU. The guest records in a location of guest memory a value indicating that the VCPU is in an idle-polling state. Then, when the hypervisor detects that a new task needs to be executed, the hypervisor reads the value in the location of the guest memory and determines that the VCPU is in the idle-polling state. Then, the hypervisor schedules the new task to the first host CPU.

18 Claims, 7 Drawing Sheets

CPU OVERCOMMIT WITH GUEST IDLE POLLING

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines, which may increase the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor.

SUMMARY

The present disclosure provides a new and innovative system and methods for central processing unit (CPU) overcommit with guest idle-polling. In an example, a system includes a memory, a plurality of host CPUs in communication with the memory, a plurality of virtual machines, and a hypervisor executing on the plurality of host CPUs. The plurality of host CPUs include a first host CPU and a second host CPU. The plurality of virtual machines execute on the plurality of host CPUs and include a first virtual machine. The first virtual machine includes a first virtual central processing unit (VCPU) and a first guest. In an example, the first VCPU executes on the first host CPU. The first guest records in a location of guest memory a value indicating that the first VCPU is in an idle-polling state. Then, when the hypervisor detects that a new task needs to be executed, the hypervisor reads the value in the location of the guest memory and determines that the first VCPU is in the idle-polling state. Responsive to determining that the first VCPU is in the idle-polling state, the hypervisor schedules the new task to the first host CPU.

Additional features and advantages of the disclosed method and apparatus are described in, and will be apparent from, the following Detailed Description and the Figures.

DETAILED DESCRIPTION OF EXAMPLE EMBODIMENTS

Figure 1:
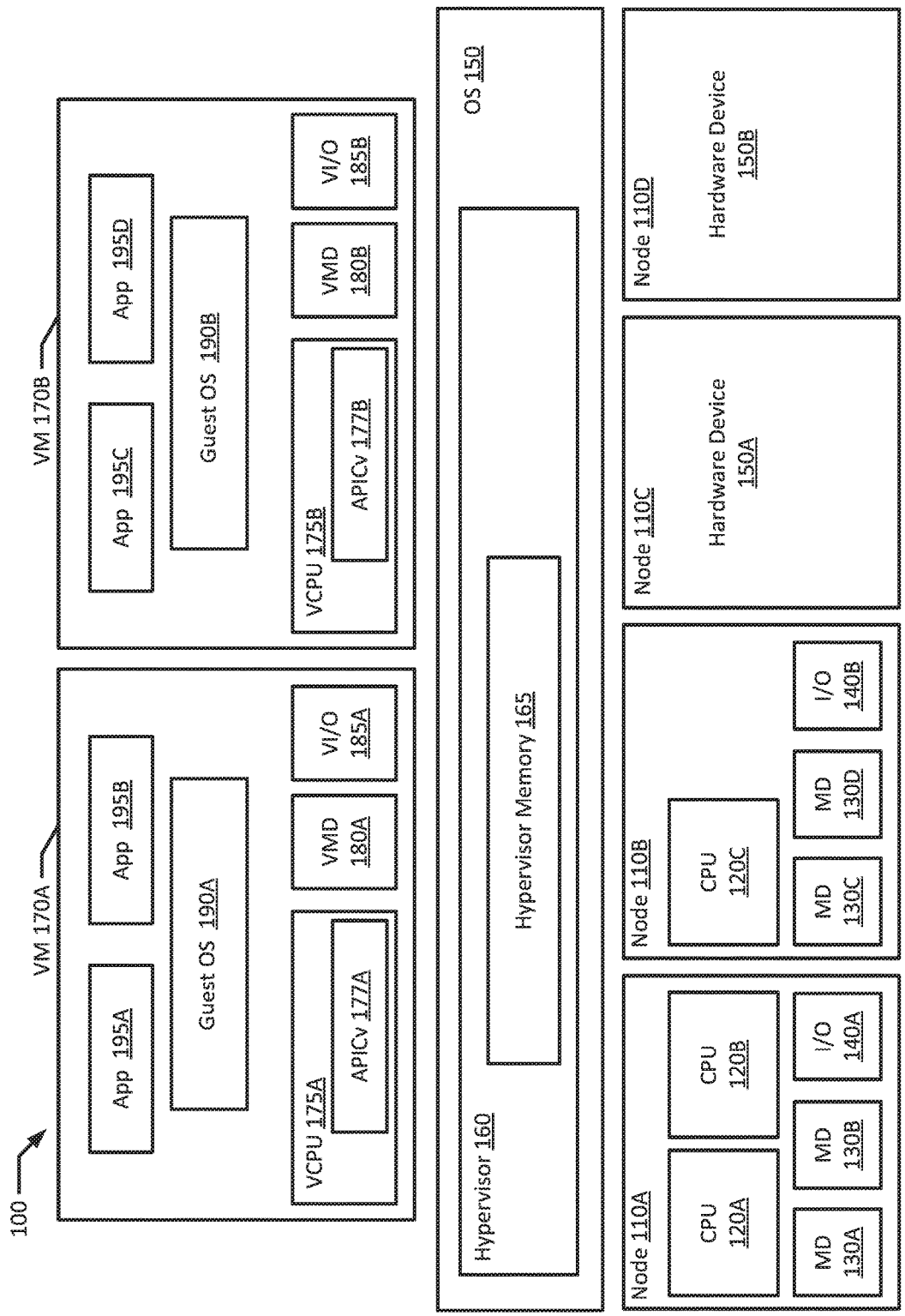
FIG. 1 is a block diagram of an example computer system according to an example of the present disclosure.

Described herein are methods and systems for CPU overcommit with guest idle-polling. Generally, when a virtual central processing unit (VCPU) has no tasks to process and enters into an idle state, a guest may send a request to halt the VCPU to the hypervisor, which may cause a virtual machine (VM) exit to the hypervisor. That is, the physical processor on which the guest/VCPU was running may be switched from a guest mode to a hypervisor mode after the guest issues the halt request. Then, the hypervisor may halt the VCPU and run another task (e.g., another VCPU) on the physical processor on which the halted VCPU was running. However, if an interrupt arrives for the halted VCPU soon after the VCPU was halted and another task starts running on the physical processor, the hypervisor may need to stop the other task (e.g., another VCPU), which may cause another VM exit to the hypervisor, and reenter the guest mode to run the halted VCPU to process the interrupt, which may increase the latency of the system.

Idle-polling is a technique where, when a VCPU becomes idle, instead of attempting to halt the VCPU by sending a halt request to the hypervisor, a virtual machine guest of the VCPU stays in the guest mode and waits for an interrupt to arrive. Idle-polling may be activated by an "idle=poll" instruction (e.g., in Linux guests). In an example, by executing a memory monitoring instruction (e.g., MWAIT and/or MONITOR), the guest may be able to put the host CPU in a power saving mode or state that is effectively similar to an idle-polling state activated by the "idle=poll" instruction. As used herein, an idle-polling state may refer to any power saving mode or state activated by the "idle=poll" instruction and/or the memory monitoring instruction. The idle-polling technique may be advantageous when the host CPU of the system supports Advanced Programmable Interrupt Controller virtualization (APICv), which enables the system to inject interrupts while staying in the guest mode without a VM exit. Unfortunately, a VCPU implementing the idle-polling may be considered as busy (i.e., not idle) to the hypervisor. That is, the hypervisor may consider the VCPU doing the idle-polling as executing a task when the VCPU is actually idle-polling. As a result, the hypervisor may not attempt to schedule a new task to the host CPU, on which the VCPU in the idle-polling state is running. Generally, when there are routinely sufficient quantities of idle processors, this approach may typically work well. However, this approach is not effective when there are not enough processors that are in an idle state.

Aspects of the present disclosure may address the above-noted deficiency. In an example, a guest of a virtual machine may send an address of a location in guest memory and information specifying which value indicates idle-polling to a hypervisor, for example, during a boot of the guest. The guest may be configured to record a value indicating whether a VCPU of the guest is in an idle-polling state in this location of the guest memory. Then, the hypervisor may record the address of the guest memory location and the information specifying which value indicates the idle-polling in hypervisor memory (e.g., in a task structure or VCPU data structure). In an example, the hypervisor may send a request to the guest that the guest record the value in this guest memory location whenever the VCPU of the guest changes its state between an idle-polling state and a non-idle-polling state.

At a later time, the hypervisor may execute the VCPU on a first host CPU. When the VCPU starts idle-polling, the guest may detect this and record in the guest memory location a value indicating that the VCPU is in an idle-polling state. At a later time, when the hypervisor detects that a new task, such as a different VCPU, needs to be executed, the hypervisor may read the address of the guest memory location and an idle-polling value (e.g., 1=idle-polling) in the information received from the guest. Then, using the address of the location of the guest memory, the hypervisor may read the value recorded in the guest memory location. Then, the hypervisor may determine that the VCPU is in the idle-polling state by comparing the value in the guest memory location with the idle-polling value. Accordingly, the hypervisor may halt the VCPU by requesting that a second host CPU send an inter-processor interrupt (IPI) to the first host CPU. Then, the hypervisor may schedule the new task (e.g., another VCPU) to the first host CPU.

In this way, the hypervisor may be able to check the state of each VCPU (e.g., whether it is in the idle-polling state) without causing a VM exit of each of the VCPU by reading the guest memory location having the VCPU state information. Also, aspects of the present disclosure may advantageously enable the system to preempt a VCPU doing idle-polling and schedule another task to the host CPU, on which that VCPU was running, which may enable efficient overcommit of the host CPUs, where more virtual machines can be executed in a given set of physical processors. This is particularly true when the task newly scheduled to the host CPU is another VCPU. That is, when the new task is another VCPU, aspects of the present disclosure may be capable of preempting the idle VCPU to schedule another VCPU without causing more VM exits, advantageously resulting in more efficient hardware processors. Additional features and advantages of the disclosed method, system, and apparatus are described below.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory (e.g., memory 130A-D) and input/output devices (e.g., I/O 140A-B). Each node 110C-D may include a hardware device 150A-B. In an example embodiment, a hardware device (e.g., 150A-B) may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow the Von Neumann architectural model and may include an arithmetic logic unit (ALU), a control unit, and a plurality of registers. In a further aspect, a processor may be a single core processor that is typically capable of executing one instruction at a time (or processing a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and, hence, share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data. The memory device 130A-D may be divided into units referred to as pages. A page is a specific amount of contiguous memory that represents the smallest unit in which an operating system allocates for various purposes. A page of memory is a set range of addresses to which data can be stored. The operating system may swap pages from working memory to longer term storage such as a non-volatile storage.

Processors 120A-C may be interconnected using a variety of techniques, ranging from a point-to-point processor interconnect, to a system area network, such as an Ethernet-based network. Local connections within each node, including the connections between a processor 120A-B and a memory device 130A-B and between a processor 120A-B and an I/O device 140A, may be provided by one or more local buses of suitable architecture, for example, a PCI. As used herein, a device of the OS 150, which may be referred to as a host device, may refer to CPU 120A-C, Memory 130A-D, I/O 140A-B, a software device, and/or a hardware device.

As noted above, computer system 100 may run multiple virtual machines (e.g., VM 170A-B) by executing a software layer (e.g., hypervisor 160) above the hardware and below the virtual machines 170A-B, as schematically shown in FIG. 1. In an example, the hypervisor 160 may be a component of the host operating system 150 executed by the computer system 100. In another example, the hypervisor 160 may be provided by an application running on the operating system 150, or may run directly on the computer system 100 without an operating system beneath it. The hypervisor 160 may virtualize the physical layer, including processors, memory, and I/O devices, and present this virtualization to virtual machines 170A-B as devices, including virtual processors (e.g., VCPU 175A-B), virtual memory (e.g., VMD 180A-B), and/or virtual I/O devices (e.g., VI/O 185A-B). Processor virtualization may be implemented by the hypervisor 160 scheduling time slots on one or more physical processors 120A-C such that from the guest operating system's perspective, those time slots are scheduled on a virtual processor 175A-B. The hypervisor 160 is provided with some memory referred to as hypervisor memory 165. Hypervisor memory 165 may correspond to physical pages in host memory 130A-D. Thus, a subset of the pages in host memory 130A-D may be specifically allocated for use by the hypervisor 160. The hypervisor 160 can use this memory to perform various tasks related to management of the virtual machines 170A-B. In an example, a virtual machine 170A-B may execute a guest operating system 190A-B, which may utilize the underlying VCPU 175A-B, VMD 180A-B, and VI/O devices 185A-B. One or more applications 195A-D may be running on a virtual machine 170A-B under the guest operating system 190A-B.

In an example, the VCPU 175A-B may include an advanced programmable interrupt controller virtualization (APICv) module 177A-B. APICv, which is provided by some Intel processors (e.g., Intel® Xeon® processors), is hardware virtualization of the Advanced Programmable Interrupt Controller (APIC). Generally, a hypervisor virtualizes guest access to interrupts and guest interrupts. However, this typically requires a VM exit and a VM reentry, which may be a main source of system overhead. The APICv module 177A-B may virtualize guest interrupts and guest access to interrupts in the hardware, not in the hypervisor and, thus, may reduce VM exits and VM reentries.

Figure 2:
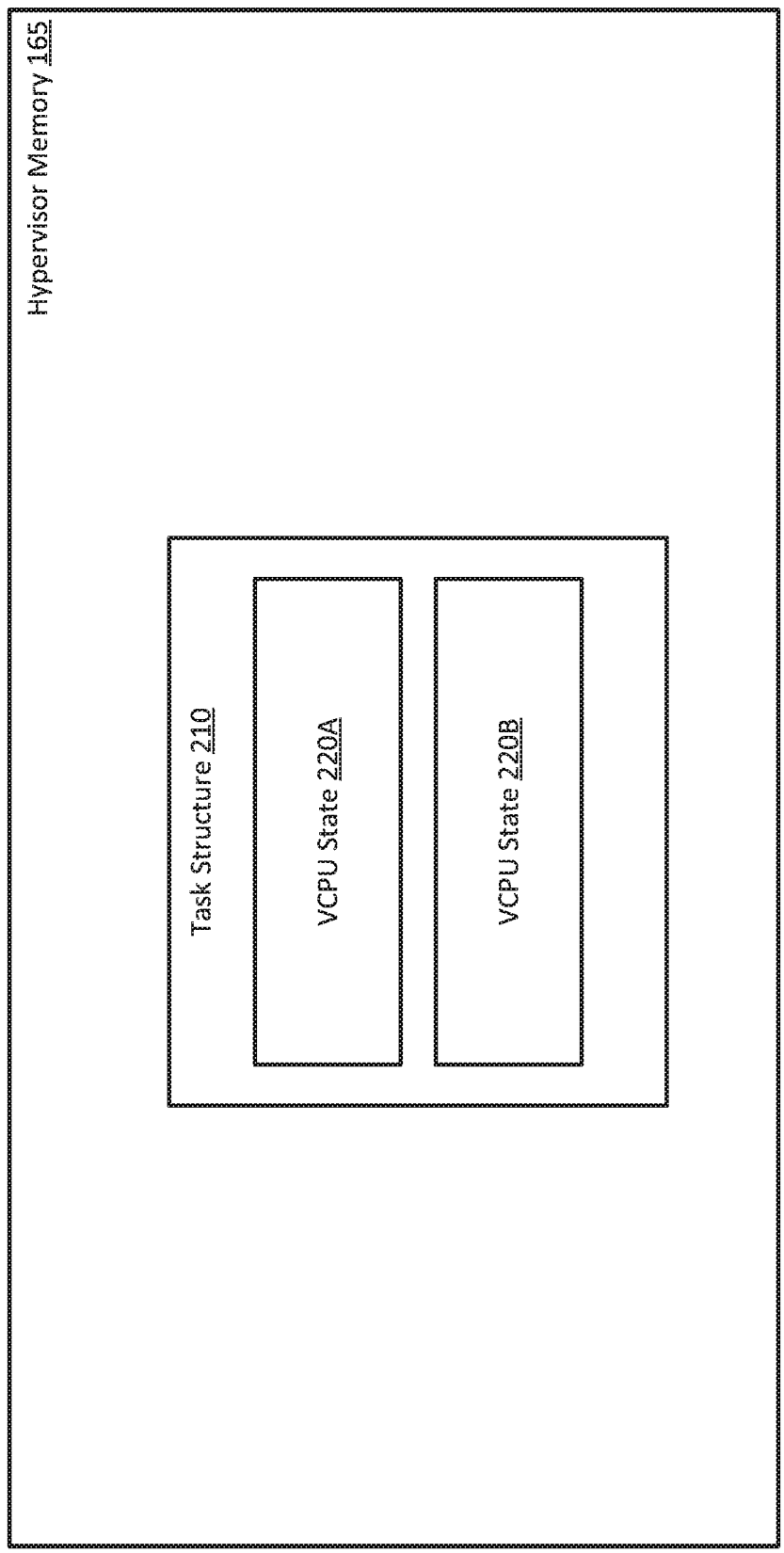
FIG. 2 is a block diagram of an example hypervisor memory according to an example of the present disclosure.

FIG. 2 illustrates an example of hypervisor memory 165. The hypervisor memory 165 may include a Task Structure 210, which is a data structure stored in memory (e.g., 130A-D). The Task Structure 210 may include information/data about each VCPU state, for example, VCPU State 220A for VCPU 175A and VCPU State 220B for VCPU 175B. For example, this information/data may include an address of a location in the guest memory (e.g., 180A-B), in which a guest records a value indicating whether a VCPU of the guest is in an idle-polling state. As used herein, guest memory may refer to guest random access memory (RAM), memory of a virtual device, or any other memory writable by the guest. As used herein, a guest may refer to any software running within the virtual machines (e.g., VM 170A-B), such as guest operating systems (e.g., guest OS 190A-B) and/or applications running on the guest operating systems (e.g., Applications 195A-D), and/or may refer to guest firmware running within the virtual machines (e.g., VM 170A-B). The information/data in the Task Structure 210 may also include information specifying which value indicates idle-polling (e.g., "0"=non-idle-polling; "1"=idle-polling).

For example, VCPU State 220A may include information about an address of a location of the guest memory 180A, in which a guest (e.g., guest OS 190A, Applications 195A-B, or guest firmware in VM 170A) records a value indicating whether VCPU 175A of the guest is in an idle-polling state. VCPU State 220A may also include information specifying which value indicates idle-polling (e.g., "0"=non-idle-polling; "1"=idle-polling). In another example, the hypervisor memory 165 may include a VCPU data structure, and such information about the guest memory address having the idle-polling state of the given VCPU and which value indicates idle-polling may be included in the VCPU data structure for each VCPU (e.g., VCPU 175A-B).

Figure 3:
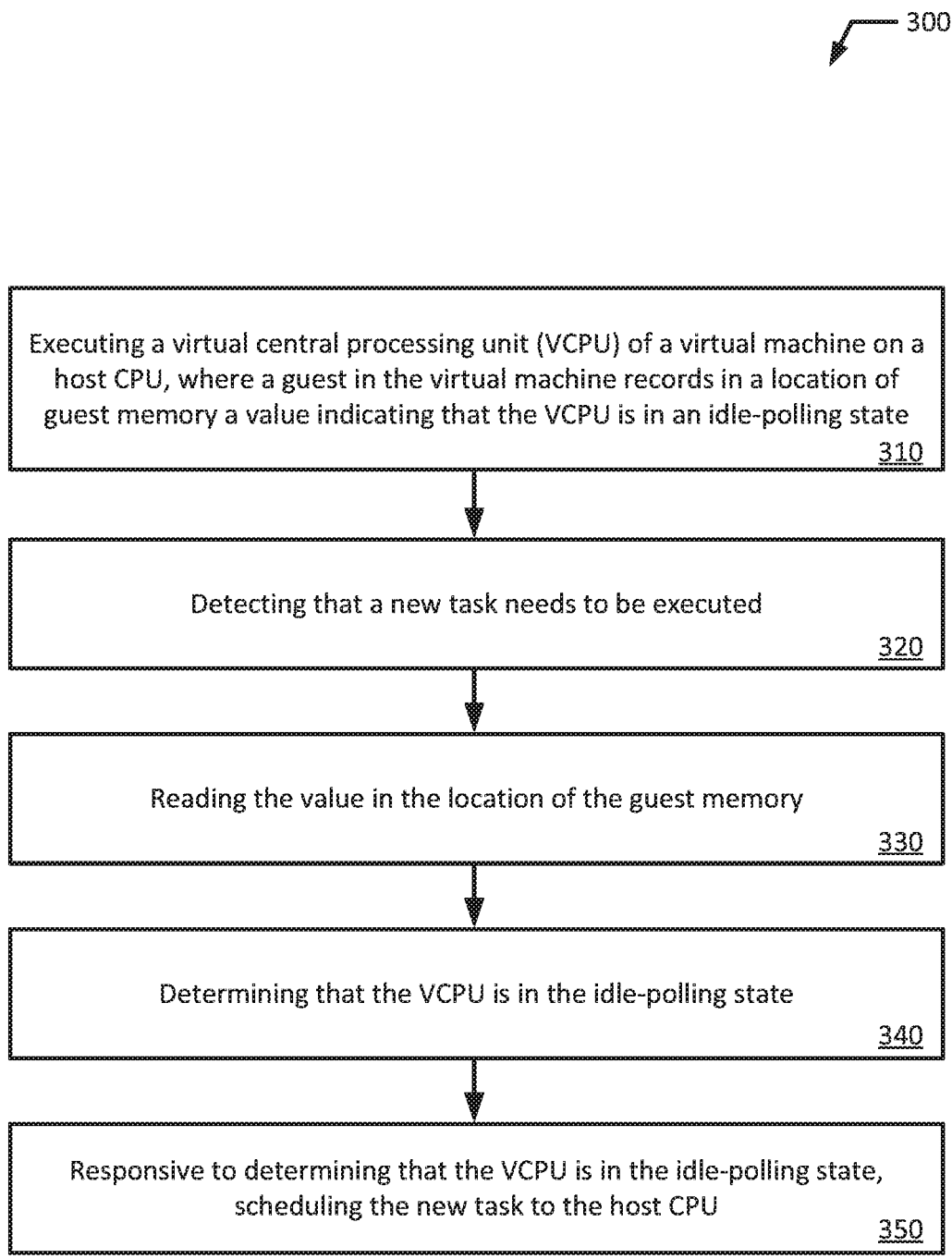
FIG. 3 is a flowchart illustrating an example process for CPU overcommit with guest idle-polling according to an example of the present disclosure.

FIG. 3 shows a flowchart of an example method 300 for CPU overcommit with guest idle-polling. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

In the illustrated example, a hypervisor may execute a VCPU of a virtual machine on a host CPU, where a guest in the virtual machine records in a location of guest memory a value indicating that the VCPU is in an idle-polling state (block 310). For example, a hypervisor 160 may execute a VCPU 175A of a virtual machine 170A on a host CPU 120A, where a guest (e.g., guest OS 190A, Applications 195A-B, or guest firmware in VM 170A) in the virtual machine 170A records in a location of guest memory 180A a value (e.g., 1) indicating that the VCPU 175A is in an idle-polling state. Then, when the hypervisor detects that a new task needs to be executed (block 320), the hypervisor may read the value in the location of the guest memory (block 330). For example, when the hypervisor 160 detects that a new task needs to be executed, the hypervisor 160 may read the value (e.g., 1) recorded in the location of the guest memory 180A.

Examples of the new task may include, but may not be limited to, executing another VCPU (e.g., VCPU 175B), executing some work (e.g., write or read instructions) on behalf of a guest, and handling networking tasks for a virtual machine. In an example, the hypervisor 160 may detect the new task when the hypervisor 160 wakes up the new task from another host CPU (e.g., CPU 120B). In an example, the hypervisor 160 may start reading a location of guest memory 180A-B for all running VCPUs 175A-B in the system at the moment when there are no idle host CPUs to process the new task. In an example, when there is an idle host CPU to process the new task, the hypervisor 160 may not read the location of the guest memory and, instead, schedule the new task to the idle host CPU.

Then, the hypervisor may determine that the VCPU is in the idle-polling state (block 340). For example, the hypervisor 160 may determine that the VCPU 175A is in the idle-polling state based on a recorded value of 1 of VCPU State 220A. Responsive to determining that the VCPU is in the idle-polling state, the hypervisor may schedule the new task to the host CPU (block 350). For example, once it is determined that the VCPU 175A is in the idle-polling state, the hypervisor 160 may halt the VCPU 175A and schedule the new task, such as VCPU 175B, to the host CPU 120A.

Figure 4A:
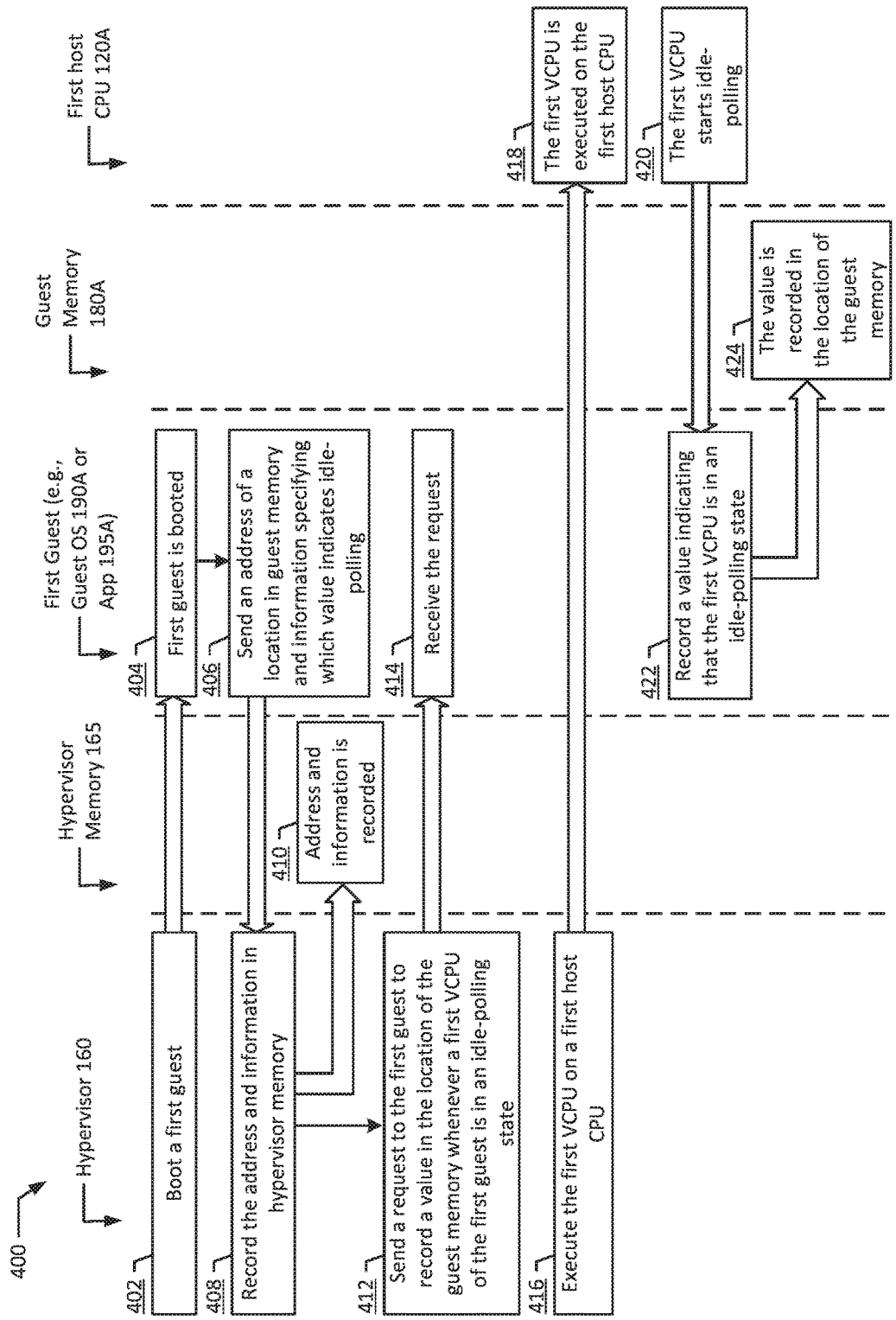
FIGS. 4A, 4B, and 4C are a flow diagram illustrating an example process for CPU overcommit with guest idle-polling according to an example of the present disclosure.
Figure 4B:
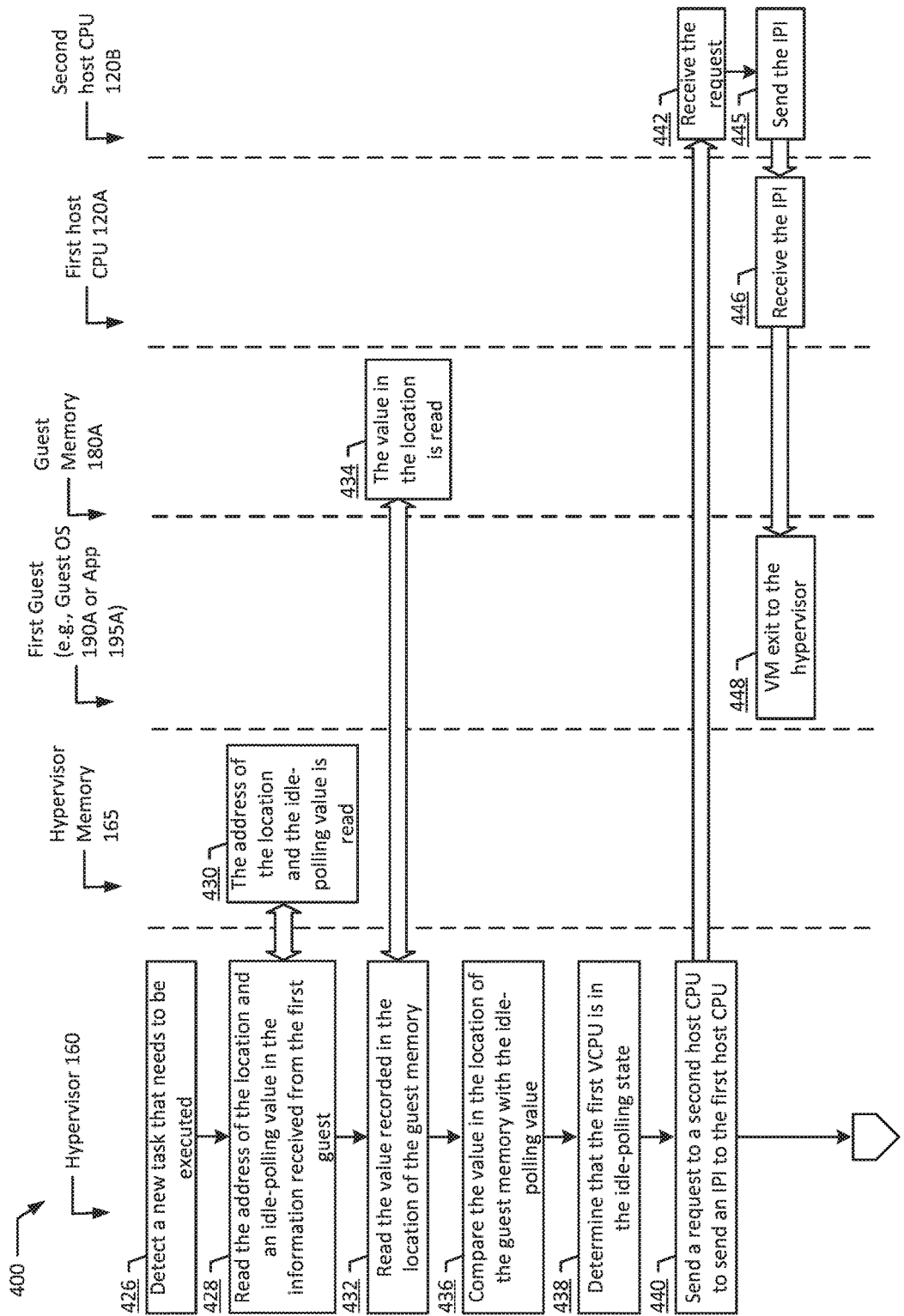
Figure 4C:
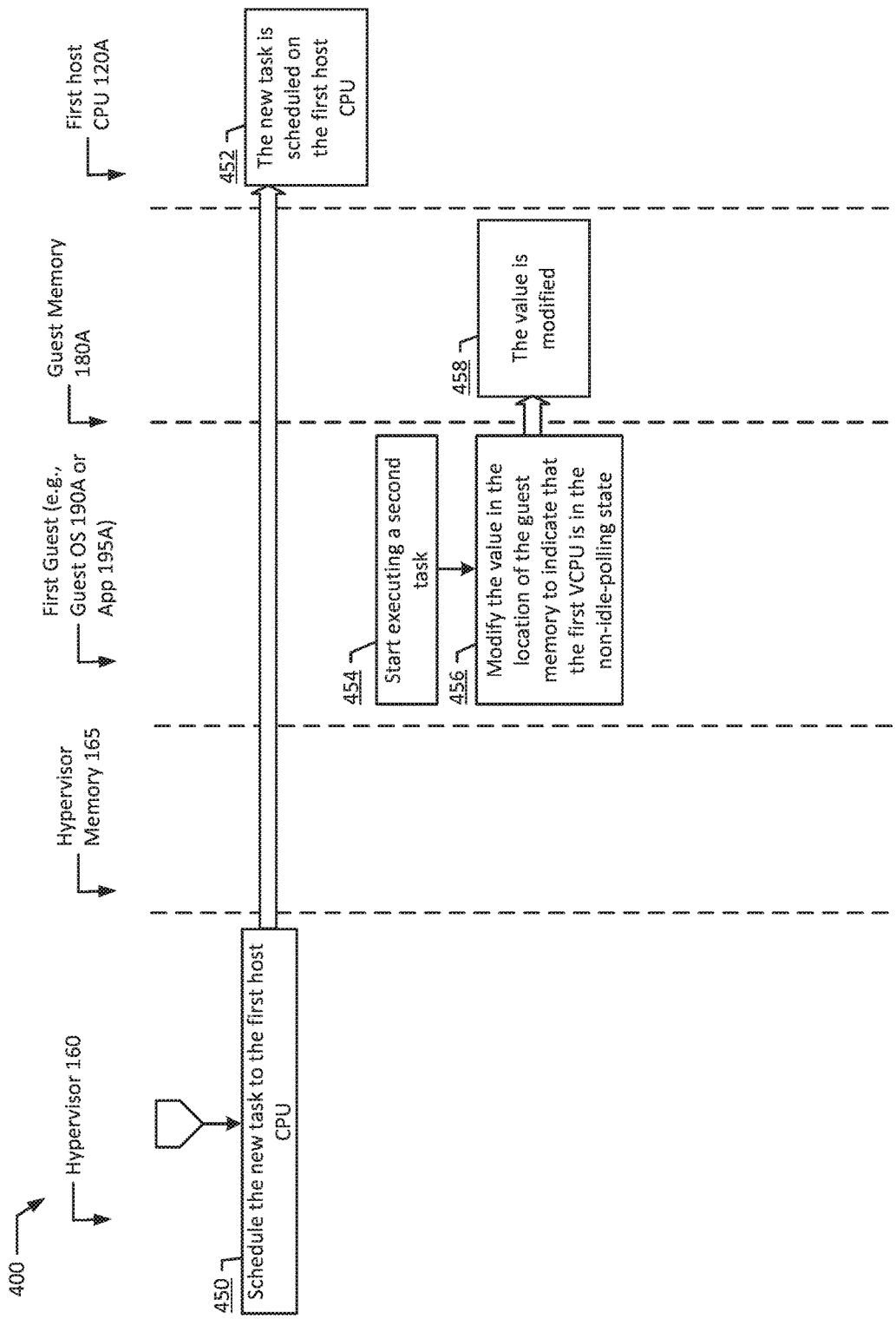

FIGS. 4A, 4B, and 4C illustrate a flow diagram of an example method 400 for CPU overcommit with guest idle-polling according to an example of the present disclosure. Although the example method 400 is described with reference to the flow diagrams illustrated in FIGS. 4A, 4B, and 4C, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. For example, the method 400 may be performed by a system including hypervisor 160, hypervisor memory 165, a first guest (e.g., Guest OS 190A or Applications 195A-B), guest memory 180A, first host CPU 120A, second host CPU 120B communicating or interacting with each other.

In the illustrated example, the hypervisor 160 may boot the first guest (blocks 402 & 404). Then, the first guest may send an address of a location in guest memory 180A and information specifying which value indicates idle-polling (block 406). In an example, the first guest may be configured to record a value indicating whether the first VCPU 175A is in an idle-polling state in this location of the guest memory 180A. In an example, the first guest may send the address of the location in the guest memory 180A and the information specifying which value indicates idle-polling during the boot of the first guest. In another example, the first guest may send the address of the location in the guest memory 180A and the information specifying which value indicates idle-polling on demand and/or at any other suitable time. In an example, instead of having the first guest send the address of the location in the guest memory 180A and the information specifying which value indicates idle-polling to the hypervisor 160, the hypervisor 160 may send the address of the location in the guest memory 180A and the information specifying which value indicates idle-polling to the guest, for example, after the boot of the guest.

Then, the hypervisor 160 may record the address of the location of the guest memory 180A and the information specifying which value indicates the idle-polling in hypervisor memory 165 (blocks 408 & 410). In an example, the hypervisor 160 may record the address of the location of the guest memory 180A and the information specifying which value indicates the idle-polling in a task structure 210 (e.g., VCPU State 220A) of the hypervisor memory 165. In another example, the hypervisor 160 may record the address of the location of the guest memory 180A and the information specifying which value indicates the idle-polling in a VCPU data structure or any other suitable memory location in the hypervisor memory 165.

In an example, the hypervisor 160 may send a request to the first guest that the first guest record the value in the location of the guest memory 180A when the first VCPU 175A is in the idle-polling state (block 412). In an example, the hypervisor 160 may send a request to the first guest that the first guest change the value in the location of the guest memory 180A whenever the first VCPU 175A changes its state between the idle-polling state and a non-idle-polling state. In another example, instead of having the hypervisor 160 send the request to the first guest, the first guest may send a notification, for example, during a boot of the first guest, to the hypervisor 160 that the first guest may record a value in the location of the guest memory 180A whenever the first VCPU 175A changes its state. In an example, this value may be 0 ("non-idle-polling") and 1 ("idle-polling"). In another example, this value may be in any other suitable format.

At a later time, the hypervisor 160 may execute the first VCPU 175A on the first host CPU 120A (blocks 416 & 418). When the first VCPU 120A starts idle-polling (block 420), the first guest may detect this and record in the location of the guest memory 180A a value indicating that the first VCPU is in an idle-polling state (blocks 422 & 424). At a later time, when the hypervisor 160 detects that a new task needs to be executed (block 426), the hypervisor 160 may read the address of the location of the guest memory 180A and an idle-polling value (e.g., 1=idle-polling) in the information received from the first guest at block 406, which are recorded in the hypervisor memory 165 (e.g., VCPU State 220A) (blocks 428 & 430). Then, using the address of the location of the guest memory 180A, the hypervisor 160 may read the value recorded in the location of the guest memory 180A (blocks 432 & 434).

Then, the hypervisor 160 may compare the value in the location of the guest memory 180A with the idle-polling value (block 436). If they are matched, the hypervisor 160 may determine that the first VCPU 175A is in the idle-polling state (block 438). In an example, if the value (e.g., 0) recorded in the location of the guest memory 180A does not match with the idle-polling value, the hypervisor 160 may determine that the first VCPU 175A is not in the idle-polling state. When it is matched, the hypervisor 160 may halt the first VCPU 175A. In an example, the hypervisor 160 may send a request to a second host CPU 120B to send an inter-processor interrupt (IPI) to the first host CPU 120A (block 440). In response to receiving the request (block 442), the second host CPU 120B may send the IPI to the first host CPU 120A (block 445). When the first host CPU 120A receives the IPI (block 446), the first guest may exit to the hypervisor 160 (block 448). Then, the hypervisor 160 may schedule the new task to the first host CPU 120A (blocks 450 & 452). In an example, the new task may be execution of another VCPU (e.g., VCPU 175B). At a later time, when the first guest starts running again, for example, to execute a second task (block 454), the first guest may modify the value in the location of the guest memory to indicate that the first VCPU 175A is in the non-idle-polling state (blocks 456 & 458).

Figure 5:
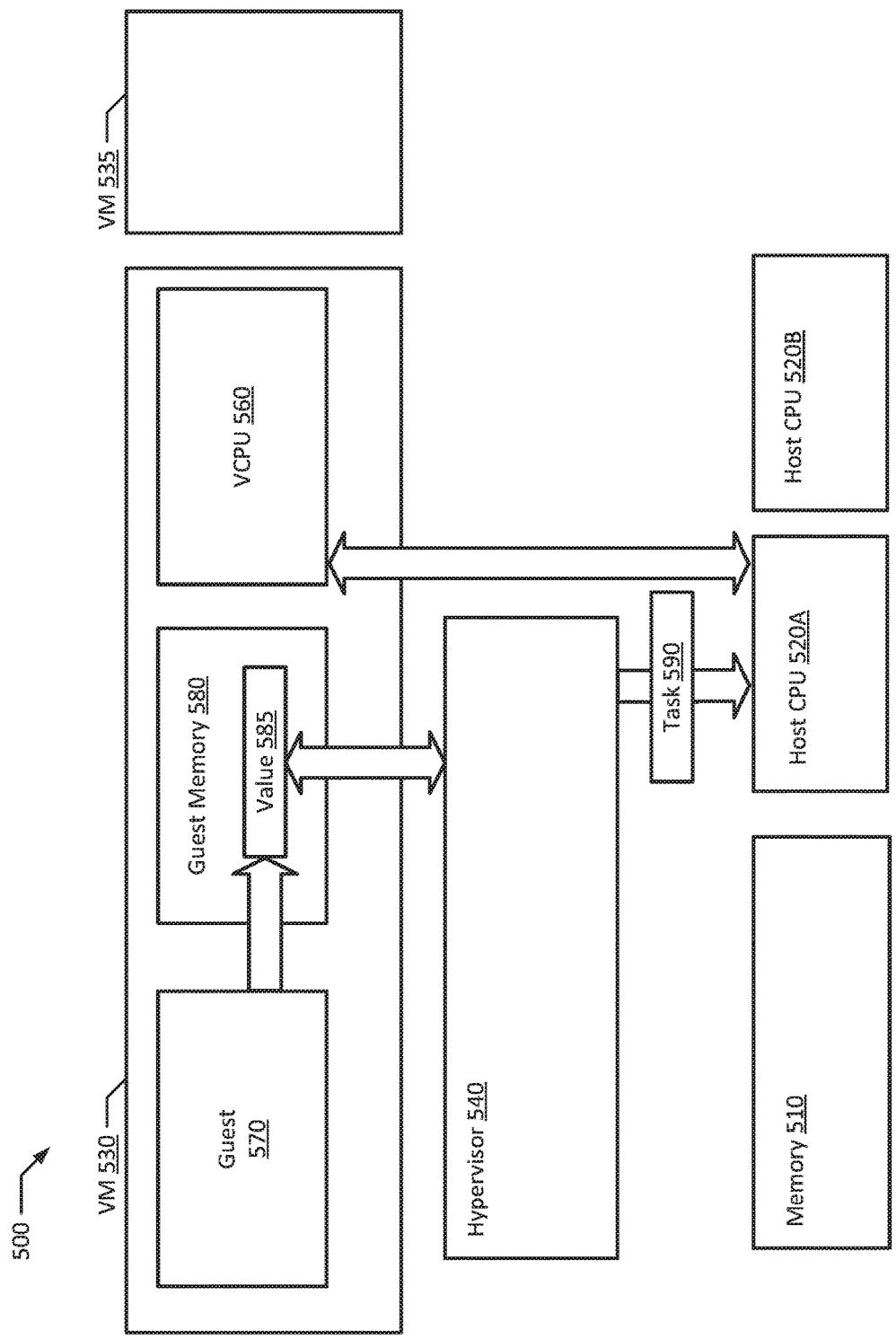
FIG. 5 is a block diagram of an example computer system according to an example of the present disclosure.

FIG. 5 shows a block diagram of an example system according to an example of the present disclosure. As illustrated in FIG. 5, an example system 500 includes a memory 510 and a plurality of host CPUs having a first host CPU 520A and a second host CPU 520B. The plurality of host CPUs 520A-B are in communication with the memory 510. The system 500 further includes a plurality of virtual machines 530 and 535, and a hypervisor 540 executing on the plurality of host CPUs 520A-B. The plurality of virtual machines 530, 535 execute on the plurality of host CPUs 520A-B. The first virtual machine 530 includes a virtual central processing unit (VCPU) 560 and a guest 570. In an example, the VCPU 560 executes on the first host CPU 520A. The guest 570 records in a location of guest memory 580 a value 585 indicating that the VCPU 560 is in an idle-polling state. Then, when the hypervisor 540 detects that a new task 590 needs to be executed, the hypervisor 540 reads the value 585 in the location of the guest memory 580 and determines that the VCPU 560 is in the idle-polling state. Responsive to determining that the VCPU 560 is in the idle-polling state, the hypervisor 540 schedules the new task 590 to the first host CPU 520A. Accordingly, the presently disclosed system may enable the hypervisor to check the state of each VCPU (e.g., whether it is in the idle-polling state) without causing a VM exit of each of the VCPU by reading the guest memory location having the VCPU state information. Also, aspects of the present disclosure may advantageously enable the system to preempt a VCPU doing idle-polling and schedule another task (e.g., another VCPU) to the host CPU, on which that VCPU was running, which may enable efficient overcommit of the host CPUs.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
responsive to receiving, from a first guest, an address of a location in guest memory and information specifying which value indicates idle-polling, recording, by a hypervisor executing on a plurality of host central processing units (CPUs) in communication with a memory, the address of the location and the information specifying which value indicates the idle-polling in hypervisor memory,
executing, by the hypervisor, a first virtual central processing unit (VCPU) of a first virtual machine on a first host CPU, wherein the plurality of host CPUs include the first host CPU and a second host CPU, wherein a plurality of virtual machines, which include the first virtual machine, execute on the plurality of host CPUs, and wherein the first guest in the first virtual machine records in the location of the guest memory a value indicating that the first VCPU is in an idle-polling state;
detecting, by the hypervisor, that a new task needs to be executed;
reading, by the hypervisor, the value in the location of the guest memory;
determining, by the hypervisor, that the first VCPU is in the idle-polling state; and
responsive to determining that the first VCPU is in the idle-polling state, scheduling, by the hypervisor, the new task to the first host CPU.

2. The method of claim 1, further comprising responsive to determining that the first VCPU is in the idle-polling state, halting, by the hypervisor, the first VCPU before scheduling the new task to the first host CPU.

3. The method of claim 2, wherein the first guest modifies the value in the location of the guest memory when the first VCPU starts executing a second task after the first VCPU is halted by the hypervisor, wherein the modified value indicates that the first VCPU is in a non-idle-polling state.

4. The method of claim 1, further comprising responsive to determining that the first VCPU is in the idle-polling state, requesting, by the hypervisor, the second host CPU to send an inter-processor interrupt to the first host CPU, which causes the first virtual machine to exit to the hypervisor, before scheduling the new task to the first host CPU.

5. The method of claim 1, wherein the hypervisor memory includes a task structure, wherein the hypervisor records the address of the location and the information in the task structure.

6. The method of claim 1, further comprising determining, by the hypervisor, that the first VCPU is in the idle-polling state by comparing the value in the location of the guest memory with an idle-polling value in the information received from the first guest.

7. The method of claim 1, wherein the first guest sends the address of the location and the information during a boot of the first guest.

8. The method of claim 1, wherein the new task includes a second VCPU in a second virtual machine, wherein the plurality of virtual machines include the second virtual machine.

9. The method of claim 1, further comprising sending, by the hypervisor, a request to the first guest that the first guest record the value in the location of the guest memory when the first VCPU is in the idle-polling state.

10. A system comprising:
a memory;
a plurality of host central processing units (CPUs) in communication with the memory, wherein the plurality of host CPUs include a first host CPU and a second host CPU;
a plurality of virtual machines executing on the plurality of host CPUs, wherein the plurality of virtual machines include a first virtual machine; and
a first virtual central processing unit (VCPU) in the first virtual machine;
a first guest in the first virtual machine; and
a hypervisor executing on the plurality of host CPUs,
wherein the first VCPU executes on the first host CPU,
wherein the first guest records in a location of guest memory a value indicating that the first VCPU is in an idle-polling state, and
wherein the hypervisor:
responsive to receiving, from the first guest, an address of the location in the guest memory and information specifying which value indicates idle-polling, records the address of the location and the information specifying which value indicates the idle-polling in hypervisor memory,
detects that a new task needs to be executed;
reads the value in the location of the guest memory;
determines that the first VCPU is in the idle-polling state; and
responsive to determining that the first VCPU is in the idle-polling state, schedules the new task to the first host CPU.

11. The system of claim 10, wherein responsive to determining that the first VCPU is in the idle-polling state, the hypervisor halts the first VCPU executing on the first host CPU before scheduling the new task to the first host CPU.

12. The system of claim 11, wherein the first guest modifies the value in the location of the guest memory when the first VCPU starts executing a second task after the first VCPU is halted by the hypervisor, wherein the modified value indicates that the first VCPU is in a non-idle-polling state.

13. The system of claim 10, wherein responsive to determining that the first VCPU is in the idle-polling state, the hypervisor requests the second host CPU to send an inter-processor interrupt to the first host CPU, which causes the first virtual machine to exit to the hypervisor, before scheduling the new task to the first host CPU.

14. The system of claim 10, wherein the hypervisor memory includes a task structure, wherein the hypervisor records the address of the location and the information in the task structure.

15. The system of claim 10, wherein the hypervisor determines that the first VCPU is in the idle-polling state by comparing the value in the location of the guest memory with an idle-polling value in the information received from the first guest.

16. The system of claim 10, wherein the first guest sends the address of the location and the information during a boot of the first guest.

17. The system of claim 10, further comprising an advanced programmable interrupt controller virtualization (APICv) module in the plurality of virtual machines.

18. A non-transitory machine readable medium storing instructions, which when executed by at least one of a plurality of host central processing units (CPUs), cause the plurality of host CPUs to:
- responsive to receiving, from a first guest, an address of a location in guest memory and information specifying which value indicates idle-polling, record, by a hypervisor executing on the plurality of CPUs, the address of the location and the information specifying which value indicates the idle-polling in hypervisor memory, execute, by the hypervisor, a first virtual central processing unit (VCPU) of a first virtual machine on a first host CPU, wherein the plurality of host CPUs include the first host CPU and a second host CPU, wherein a plurality of virtual machines, which include the first virtual machine, execute on the plurality of host CPUs, and wherein the first guest in the first virtual machine records in the location of the guest memory a value indicating that the first VCPU is in an idle-polling state;
- detect, by the hypervisor, that a new task needs to be executed;
- read, by the hypervisor, the value in the location of the guest memory;
- determine, by the hypervisor, that the first VCPU is in the idle-polling state; and
- responsive to determining that the first VCPU is in the idle-polling state, schedule, by the hypervisor, the new task to the first host CPU.

* * * * *